(12) United States Patent
Lam et al.

(10) Patent No.: US 7,929,131 B2
(45) Date of Patent: Apr. 19, 2011

(54) HIGHLY COMPACT DESIGN FOR RAMAN SPECTROMETRY

(75) Inventors: Tony Lam, Artesia, CA (US); ChenChun Wu, Salt Lake City, UT (US)

(73) Assignee: Enwave Optronics, Inc.

( * ) Notice: Subject to any disclaimer, the term of this patent is extended or adjusted under 35 U.S.C. 154(b) by 176 days.

(21) Appl. No.: 12/429,020

(22) Filed: Apr. 23, 2009

(65) Prior Publication Data
US 2010/0271630 A1 Oct. 28, 2010

(51) Int. Cl.
*G01J 3/44* (2006.01)
*G01N 21/65* (2006.01)
(52) U.S. Cl. ........................................ 356/301; 359/634
(58) Field of Classification Search .................... 356/301
See application file for complete search history.

(56) References Cited

U.S. PATENT DOCUMENTS
2009/0231578 A1* 9/2009 Ling et al. ..................... 356/301
* cited by examiner

*Primary Examiner* — F. L Evans
(74) *Attorney, Agent, or Firm* — Stetina Brunda Garred & Brucker

(57) ABSTRACT

There is provided a Raman signal detection including a laser emitter and an optical element. The optical element includes an optical element body, an emitter face with a short pass optical coating, a Raman signal face with a long pass optical coating and a sample face. The optical element is positioned with a laser emitter output beam incident upon the emitter face. The emitter face receives the laser emitter output beam and transmits an emitter face output beam through the optical element body and the sample face to emit a sample face output beam. The sample face receives and transmits a sample reflection beam generated from the sample face output beam to the emitter face. The emitter face reflects and transmits the sample reflection beam the sample reflection beam through the Raman signal face to emit a Raman signal output beam to a Raman signal detector.

22 Claims, 2 Drawing Sheets

HIGHLY COMPACT DESIGN FOR RAMAN SPECTROMETRY

CROSS-REFERENCE TO RELATED APPLICATIONS

Not Applicable

STATEMENT RE: FEDERALLY SPONSORED RESEARCH/DEVELOPMENT

Not Applicable

BACKGROUND

Raman spectroscopy takes advantage of the inelastic scattering of monochromatic laser light by molecules. Energy from the laser is exchanged with the molecules in such a way that the scattered light photons have higher or lower energy than the incident photons. The difference in energy is due to a change in the rotational and vibrational energy of the molecule and gives information about the molecular energy levels. Since different molecules show different energy changes, the Raman technique can be used as a qualitative or quantitative analysis method.

Although Raman spectroscopy has become a major tool for the analytical chemist in recent years, many applications require greater setup and operational simplicity for routine usage. In this regard Raman measurements are used by a variety of chemists, biologists and physicists as well as laboratory, manufacturing and field technicians. Traditional Raman instrumentation uses many components (including lenses, bandpass, rejection, and dichroic filters/mirrors) in the designs that results in relatively larger sizing and higher costs. However, contemporary Raman spectroscopy applications require compact sizing (like handheld devices), lower instrumentation and running costs.

In view of the foregoing, there is a need in the art of an improved Raman optical device design in comparison to the prior art.

BRIEF SUMMARY

There is provided a Raman signal detection system for use with a sample. The detection system includes a laser emitter configured to emit a laser emitter output beam. The detection system further includes a transmissive optical element. The optical element includes an optical element body, an emitter face, a Raman signal face and a sample face. The emitter face includes a short pass optical coating. The Raman signal face includes a long pass optical coating. The sample face includes a substantially non-reflective coating. The optical element is positioned with the laser emitter output beam incident upon the emitter face. The emitter face is configured to receive the laser emitter output beam and transmit an emitter face output beam through the optical element body and through the sample face to emit a sample face output beam for emission upon a sample. The sample face is configured to receive a sample reflection beam generated from the sample face output beam illuminating the sample and transmit the sample reflection beam to the emitter face. The emitter face is further configured to reflect the sample reflection beam and transmit the sample reflection beam through the optical element body and through the Raman signal face to emit a Raman signal output beam. The detection system further includes a Raman signal detector positioned to receive the Raman signal output beam.

According to various embodiments, the optical element may be positioned with the laser emitter output beam is incident upon the emitter face at an angle of incidence between 5 degrees and 75 degrees. The emitter face may be disposed between 15 and 75 degrees to the sample face, and the emitter face may be disposed between 15 and 75 degrees to the Raman signal face, and the sample face may be disposed between 30 and 150 degrees to the Raman signal face, for examples. The optical element may be a prism. The optical element may be configured to transmit the Raman signal face output beam at an angle of emission between 0 and 45 degrees. The optical element may be configured to transmit the sample face output beam at an angle of emission between 0 and 45 degrees. The detection system may further include a sample coupling lens positioned to receive the sample face output beam for emission upon a sample and to receive the sample reflection beam for transmission through the optical element body. The sample coupling lens may be attached to the sample face. The detection system may further include a Raman signal coupling lens positioned to receive the Raman signal output beam. The Raman signal coupling lens may be attached to the Raman signal face.

According to another embodiment, there is provided a Raman signal optical device for use with a laser emitter, a sample and a Raman signal detector, the laser emitter configured to emit a laser emitter output beam. The optical device may take the form of the transmissive optical element as described above.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. Reference throughout the detailed description to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this detailed description are not necessarily all referring to the same embodiment. The following description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described to avoid obscuring aspects of the invention. It is further understood that the use of relational terms such as first and second, and the like are used solely to distinguish one from another entity without necessarily requiring or implying any actual such relationship or order between such entities.

Figure 1:
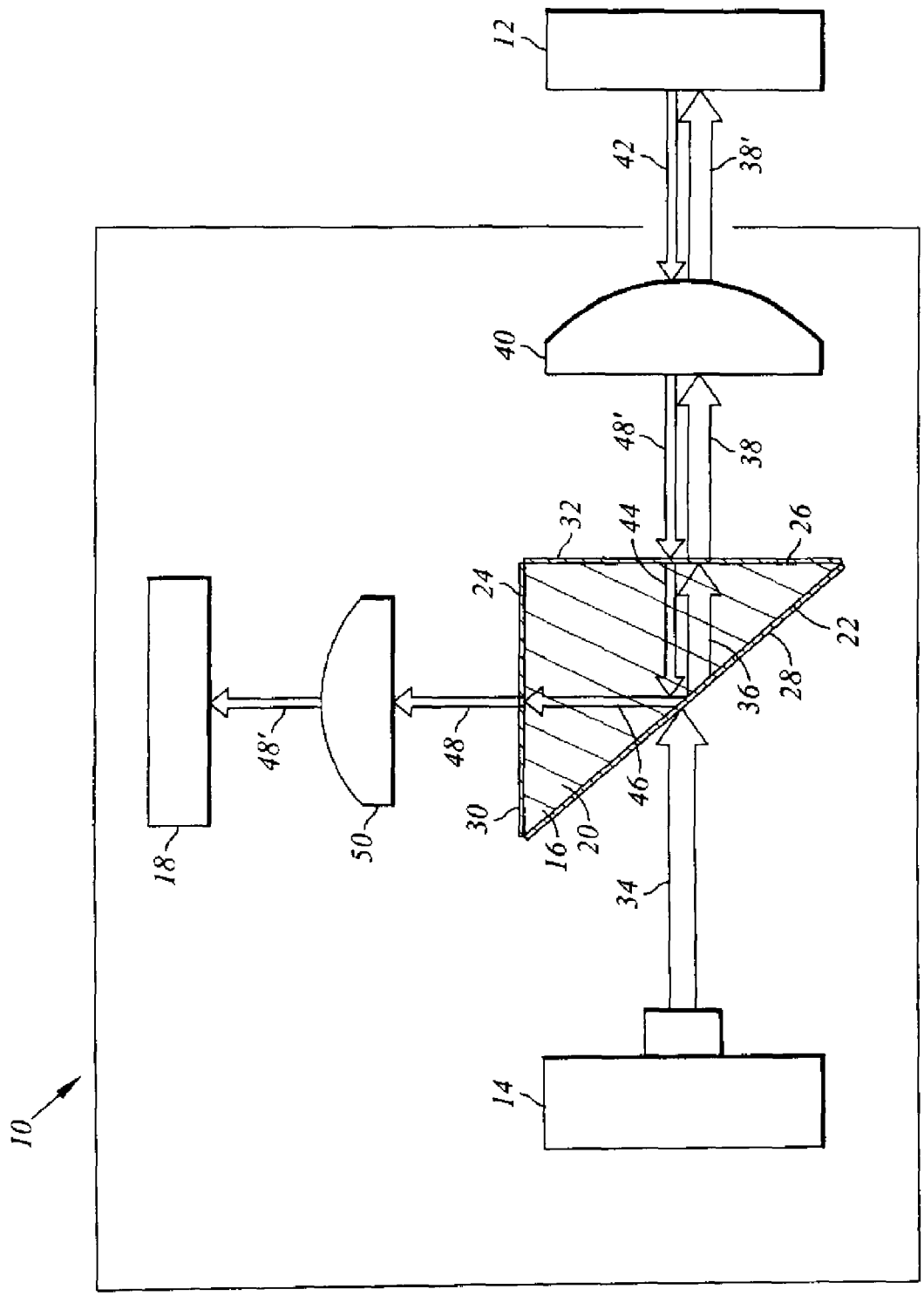
FIG. 1 depicts a side view of a Raman signal detection system and a sample with laser beams symbolically illustrated.

Referring now to FIG. 1, according to an aspect of the invention, there is depicted a side view of a Raman signal detection system 10 for use with a sample 12. The Raman signal detection system 10 includes a laser emitter 14, a transmissive optical element 16 and a Raman signal detector 18. The laser emitter 14 is configured to emit a laser emitter output beam 34. The transmissive optical element 16 includes an optical element body 20, an emitter face 22, a Raman signal face 24 and a sample face 26. The emitter face 22 includes a short pass optical coating 28. The Raman signal face 18 includes a long pass optical coating 30. The sample face 26 includes a substantially non-reflective coating 32. The optical element 16 is positioned with the laser emitter output beam 34 incident upon the emitter face 22. The emitter face 22 is configured to receive the laser emitter output beam 34 and transmit an emitter face output beam 36 through the optical element body 16 and through the sample face 26 to emit a sample face output beam 38 for emission upon the sample 12. The sample face 26 is configured to receive a sample reflection beam 42 generated from the sample face output beam 38 illuminating the sample 12 and transmit the sample reflection beam 42 to the emitter face 22. The emitter face 22 is further configured to reflect the sample reflection beam 42 and transmit the sample reflection beam 42 through the optical element body 20 and through the Raman signal face 24 to emit a Raman signal output beam 48. The Raman signal detector 18 positioned to receive the Raman signal output beam 48.

According to various embodiments, the optical element 16 may be positioned with the laser emitter output beam 34 incident upon the emitter face 22 at an angle of incidence between 5 degrees and 75 degrees. The angle of incidence is formed by the laser emitter output beam 34 incident on a surface of the emitter face 22 and a perpendicular to that surface at the point of incidence. In the embodiment depicted, the angle of incidence is 45 degrees. In the embodiment illustrated, the emitter face 22 is disposed at 45 degrees to the sample face 26, and the emitter face 22 is disposed at 45 degrees to the Raman signal face 24. The sample face 26 is disposed at 90 degrees to the Raman signal face 24. It is contemplated that other angular configurations may be implemented. In this regard, the emitter face 22 may be disposed between 15 and 75 degrees to the sample face 26, and the emitter face 22 may be disposed between 15 and 75 degrees to the Raman signal face 24. The sample face 26 may be disposed at 30 and 150 degrees to the Raman signal face 24. Further, the optical element 16 may be configured to transmit the Raman signal face output beam 48 at an angle of emission between 0 and 45 degrees. In the embodiment depicted the angle of emission is at 0 degrees. The optical element 16 may be configured to transmit the sample face output beam 38 at an angle of emission between 0 and 45 degrees. In the embodiment depicted the angle of emission is at 0 degrees.

The optical element 16 may be a prism. The optical element 16 may be formed of any of those materials and constructed in accordance with any of those techniques which are well known to one of ordinary skill in the art.

The detection system 10 may further include a sample coupling lens 40 positioned to receive the sample face output beam 38 for emission upon a sample 12 and to receive the sample reflection beam 42 for transmission through the optical element body 20. The detection system 10 may further include a Raman signal coupling lens 50 positioned to receive the Raman signal output beam 48 for transmission to the Raman signal detector 18.

In further detail, as mentioned above, the laser emitter 14 produces a laser emitter output beam 36. The laser emitter output beam 36 is transmitted through the short pass optical coating 28 and continues through the optical element 16 as the emitter face output beam 36. The short pass optical coating 28 is used as a bandpass coating layer and acts to remove and "clean up" unwanted pedestal contamination emissions in the laser emitter output beam 36.

The signal continues to pass through the non-reflective coating 32 as indicated by the sample face output beam 38. Where the sample coupling lens 40 is implemented, the signal continues on in the form of the sample face output beam 38' that impinges on the sample 12. The sample coupling lens 32 may take the form of any of those optical lenses or other apparatus that may be used to enhance, filter or condition the sample face output beam 38 to the sample 12 or the sample reflection beam 42 from the sample 12. As such, the sample coupling lens 32 may be used to focus the laser beam to the sample 12 and collimate/couple the signal back to the detection system.

The sample reflection beam 42 passes through the sample coupling lens 40 and continues as sample reflection beam 42' that impinges upon the non-reflective coating 32. As such, the signal progresses into the optical element body 20 as a sample reflection beam 44 that is incident upon an interior side of the emitter face 22. As mentioned above, the emitter face 22 is configured to reflect the sample reflection beam 42 (specifically the sample reflection beam 44) and transmit the sample reflection beam 42 through the optical element body 20). It is noted that such reflection need not be absolute and is variable upon the particular design and material selections of the emitter face 22 and short pass optical coating 28.

The signal continues in the form of the sample reflection beam 46 through the optical element 16 to the Raman signal face 24. The signal continues through the long pass optical coating 30 in the form of the Raman signal output beam 48. Thus, the long pass optical coating 30 is used to further filter the signal. Where the Raman signal coupling lens 50 is implemented, the signal continues on in the form of the Raman signal output beam 48' that is collected by the Raman signal detector 18.

As one of ordinary skill in the art will recognize the specific degree and profile of wavelength rejection and filtering may be adjusted according to those techniques and material selection and sizing of the short pass optical coating 22 and long pass optical coating 24 together with the nature of the laser emitter output beam 34 and requirements of the Raman signal detector 18. For example, the short pass coating 22 may be formed of a UV-Grade fused silica with transmittance over 531-533 nm wavelengths of >90%, reflectance over 539-850 nm wavelengths of >90%, AR coating on backside over 531-533 nm wavelengths of <0.5%, and surface quality (scratch/dig) of 60/40. The long pass coating 24 may be formed of a UV-Grade fused silica with transmittance over 539-850 nm wavelengths of >90%, blocking over 531-533 nm wavelengths O.D. of >5, AR coating on backside over 539-850 nm wavelengths of <0.5%, and surface quality (scratch/dig) of 60/40.

As such, it is contemplated that the Ramen signal detection system 10 according to aspects of the present invention using a very compact single element for reducing laser source interference, rejecting laser-line, and separating laser and signal bands all at the same time in the same overall structure or component. The design reduces manufacturing cost and instrument size while improving robustness. Compared to many traditional designs that must utilize multiple components (including bandpass, rejection, and dichroic filters/mirrors), this invention may utilize only single structural component for Raman signal detection that can provides a very low cost and yet high performance Raman signal detection system.

According to another aspect of the invention, there is provided an optical device that may take the form of the transmissive optical element 16 with the short pass optical coating 28, the long pass optical coating 30, and the non-reflective coating 32 as described above.

Figure 2:
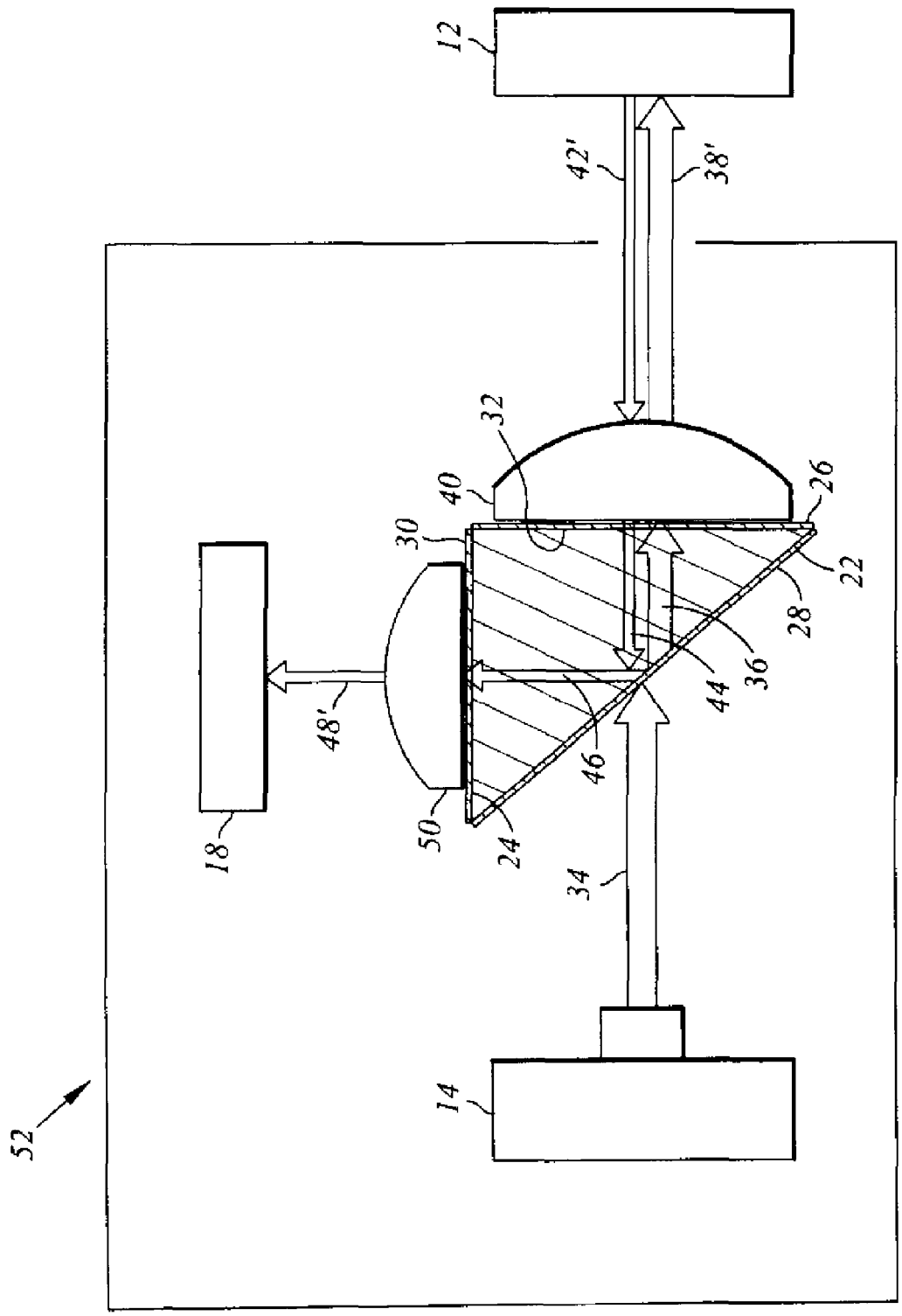
FIG. 2 depicts a side view of a Raman signal detection system according to another embodiment.

Referring now to FIG. 2 there is illustrated another embodiment. Like reference numerals are intended to represent similar elements are previously described above. There is provided a Raman signal optical device 52 for use with the laser emitter 14, the sample 12 and the Raman signal detector 18. In this embodiment, the sample coupling lens 40 is attached to the sample face 26. In particular, the sample coupling lens 40 is attached to the non-reflective coating 32. In addition Raman signal coupling lens 50 is attached to the Raman signal face 24. In particular, the Raman signal coupling lens 50 is attached to the long pass coating 30. It is contemplated that an optical grade epoxy may be used for such attachment. These attachments facilitate the optical device to be extremely compact in design and represents a significant improvement over the prior art.

What is claimed is:

1. A Raman signal detection system for use with a sample, the detection system comprising:
   a laser emitter configured to emit a laser emitter output beam;
   a transmissive optical element including an optical element body, an emitter face, a Raman signal face and a sample face, the emitter face including a short pass optical coating, the Raman signal face including a long pass optical coating, the sample face including a substantially non-reflective coating, the optical element being positioned with the laser emitter output beam incident upon the emitter face, the emitter face being configured to receive the laser emitter output beam and transmit an emitter face output beam through the optical element body and through the sample face to emit a sample face output beam for emission upon a sample, the sample face being configured to receive a sample reflection beam generated from the sample face output beam illuminating the sample and transmit the sample reflection beam to the emitter face, the emitter face further being configured to reflect the sample reflection beam and transmit the sample reflection beam through the optical element body and through the Raman signal face to emit a Raman signal output beam; and
   a Raman signal detector positioned to receive the Raman signal output beam.

2. The detection system of claim 1 wherein the optical element is positioned with the laser emitter output beam incident upon the emitter face at an angle of incidence is between 5 degrees and 75 degrees.

3. The detection system of claim 1 wherein the emitter face is disposed between 15 and 75 degrees to the sample face.

4. The detection system of claim 1 wherein the emitter face is disposed between 15 and 75 degrees to the Raman signal face.

5. The detection system of claim 1 wherein the sample face is disposed between 30 and 150 degrees to the Raman signal face.

6. The detection system of claim 1 wherein the optical element is a prism.

7. The detection system of claim 1 wherein the optical element is configured to transmit the Raman signal face output beam at an angle of emission between 0 and 45 degrees.

8. The detection system of claim 1 wherein the optical element is configured to transmit the sample face output beam at an angle of emission between 0 and 45 degrees.

9. The detection system of claim 1 further includes a sample coupling lens positioned to receive the sample face output beam for emission upon a sample and to receive the sample reflection beam for transmission through the optical element body.

10. The detection system of claim 9 wherein the sample coupling lens is attached to the sample face.

11. The detection system of claim 1 further includes a Raman signal coupling lens positioned to receive the Raman signal output beam.

12. The detection system of claim 11 wherein the Raman signal coupling lens is attached to the Raman signal face.

13. A Raman signal optical device for use with a laser emitter, a sample and a Raman signal detector, the laser emitter configured to emit a laser emitter output beam, the optical device comprising:
   a transmissive optical element including an optical element body, an emitter face, a Raman signal face and a sample face, the emitter face including a short pass optical coating, the Raman signal face including a long pass optical coating, the sample face including a substantially non-reflective coating, the optical element being positioned with the laser emitter output beam incident upon the emitter face, the emitter face being configured to receive the laser emitter output beam and transmit an emitter face output beam through the optical element body and through the sample face to emit a sample face output beam for emission upon a sample, the sample face being configured to receive a sample reflection beam generated from the sample face output beam illuminating the sample and transmit the sample reflection beam to the emitter face, the emitter face further being configured to reflect the sample reflection beam and transmit the sample reflection beam through the optical element body and through the Raman signal face to emit a Raman signal output beam for use by the Raman signal detector.

14. The optical device of claim 13 wherein the optical element is positioned with the laser emitter output beam is incident upon the emitter face at an angle of incident is between 5 degrees and 75 degrees.

15. The optical device of claim 13 wherein the emitter face is disposed between 15 and 75 degrees to the sample face.

16. The optical device of claim 13 wherein the emitter face is disposed between 15 and 75 degrees to the Raman signal face.

17. The optical device of claim 13 wherein the sample face is disposed between 30 and 150 degrees to the Raman signal face.

18. The optical device of claim 13 wherein the optical element is a prism.

19. The optical device of claim 13 wherein the optical element is configured to transmit the Raman signal face output beam at an angle of emission between 0 and 45 degrees.

20. The optical device of claim 13 wherein the optical element is configured to transmit the sample face output beam at an angle of emission between 0 and 45 degrees.

21. The optical device of claim 13 further includes a sample coupling lens positioned to receive the sample face output beam for emission upon a sample and to receive the sample reflection beam for transmission through the optical element body, the sample coupling lens is attached to the sample face.

22. The optical device of claim 13 further includes a Raman signal coupling lens positioned to receive the Raman signal output beam, the Raman signal coupling lens is attached to the Raman signal face.

* * * * *